Sept. 11, 1945.　　　J. PLUM ET AL　　　2,384,490
SWIVEL
Filed Sept. 5, 1944
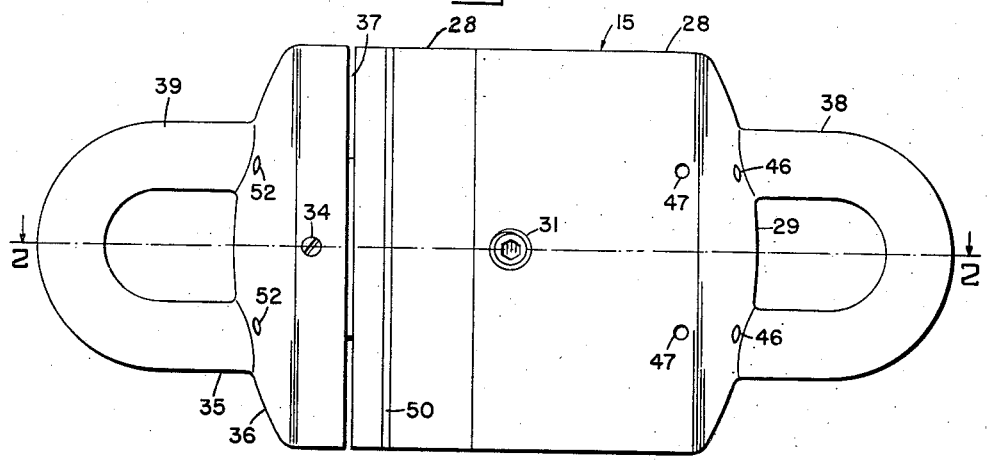
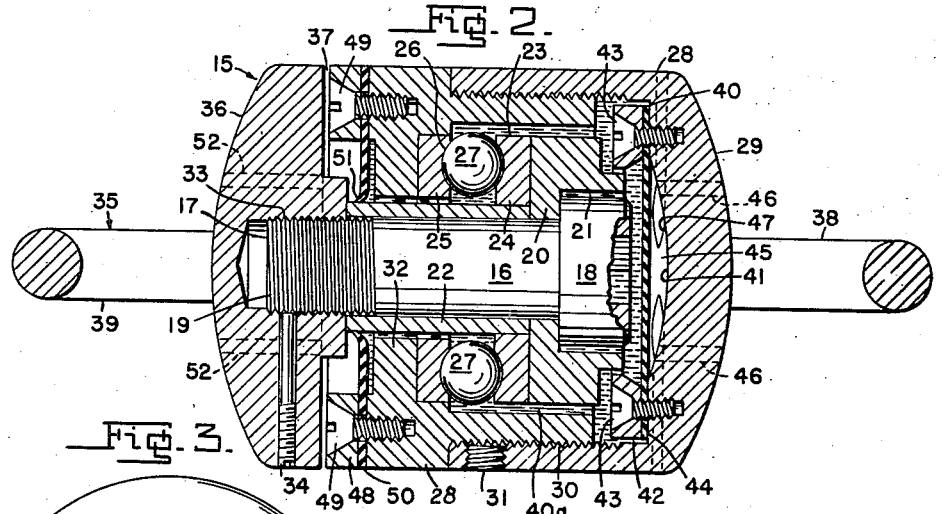
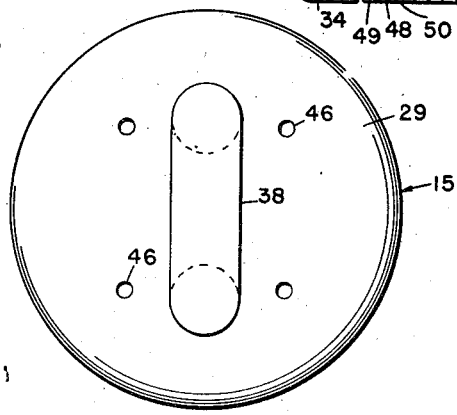
INVENTORS.
John Plum
Harry B. Maris
BY
ATTORNEY.

UNITED STATES PATENT OFFICE 2,384,490

SWIVEL

John Plum, Washington, D. C., and Harry B. Maris, Riverdale, Md.

Application September 5, 1944, Serial No. 552,790

8 Claims. (Cl. 287—91)

(Granted under the act of March 3, 1883, as amended April 30, 1928; 370 O. G. 757)

The present invention relates to improvements in swivels and more particularly to a lubricated antifriction underwater swivel for transmitting axial tension loads.

In the towing by cable of various special nautical devices, such as paravanes, otter boards, floats and mine sweeping equipment, various conditions of operation are encountered wherein sufficient torque is produced in the underwater tow cable to interfere with the stability and control of the device being towed.

Moreover, the presence of high torque in a towing cable is dangerous to personnel, for, if the cable should break, the torque therein will be suddenly released, and the free ends of the cable will whip and fly about wildly, tending to flail anyone in the vicinity.

An important object of this invention is to provide an underwater swivel for insertion in the tow cable, or between the tow cable and the object to be towed, and which will substantially eliminate or materially reduce the cable torque so as to permit the towed object to operate in a normal manner.

Another object of the invention is the provision of a lubricated anti-friction swivel provided with means for equalizing the pressure of the lubricant and the pressure of the water normally surrounding the swivel, thereby tending to prevent the ingress of water when the swivel is operating at a great depth, or the escape of lubricant when the swivel is lying out of water, for instance, on a sun-baked deck.

Other objects and advantages of the invention will become apparent during the course of the following detailed description, taken in connection with the accompanying drawing, forming a part of this specification, and in which drawing, Figure 1 is a side elevational view of the improved swivel.

Figure 2 is a central vertical longitudinal sectional view of the swivel, substantially on the line 2—2 of Figure 1.

Figure 3 is an end elevational view of the swivel.

In the drawing, which for the purpose of illustration shows only a preferred embodiment of the invention, and wherein similar reference characters denote corresponding parts throughout the several views, the numeral 15 generally designates the swivel, having a cylindrical axle 16 including a conventional cap screw 17 comprising a socket head 18 and a threaded shank 19. On the screw 17 adjacent the head 18 is an annular enlargement or collar 20 internally recessed at 21 for the reception of the screw head 18. Surrounding the shank 19 adjacent the collar 20 is a sleeve 22 which terminates inwardly of the threaded end portion of the shank 19. Mounted on the sleeve 22 is an annular axial thrust anti-friction bearing 23 including spaced plates 24, 25 defining an annular raceway 26 for a plurality of balls 27.

Surrounding this bearing 23 is a cylindrical housing or shell 28 including a convex end wall 29, preferably formed as a separate part and releasably fastened to the shell, as by threads 30 and set screw 31. At its opposite end, the shell 28 is formed with an inwardly extending annular closure 32 encircling and slightly spaced from the sleeve portion 22 of said cylindrical axle 16 and engaging the thrust bearing 23 at plate 25.

Releasably fixed on the threaded shank 19 of the screw 17, as by internal screw threads 33 and set screw 34, is a cable attachment member 35 including a circular, externally convex wall 36 engaging the spacer sleeve 22 and defining an annular space 37 adjacent that end of the cylindrical shell formed by the annular closure 32. In the example shown, eyes or loops 38, 39 are welded to or otherwise formed integrally with the convex end walls 29, 36 so that the swivel may be inserted in a tow cable (not shown) or between one end of a cable and an object to be towed.

The cylindrical shell 28 is filled with any suitable lubricant 40a, and the means hereinafter described is provided for applying and maintaining a pressure on the lubricant substantially equal to the pressure of the medium, usually water or air, surrounding the shell. Secured to the annular marginal edge portion 40 of the inner concave face 41 of the end wall 29, as by an annular clamp 42 and screws 43 is a flexible plastic diaphragm 44, preferably formed of Vinylite which is not affected by oil, and defining an expansion chamber 45 communicating with the exterior of the housing or shell 28, as by longitudinal ducts 46 and radial ducts 47. Secured to the annular closure 32, as by a clamping ring 48 and screws 49, is an annular flexible plastic diaphragm 50 having an internal diameter normally slightly smaller than the outer diameter of the sleeve 22 so that the tapered inner marginal edge 51 of the diaphragm will wipe the cylindrical surface of the sleeve 22 and tend to form a seal. Preferably the wall 36 is provided with longitudinal ducts 52 similar to the ducts 46 in the wall 29.

During use of the swivel 15 underwater, the external hydraulic pressure is transmitted to the diaphragms 44, 50, which thereupon flex inwardly so as to apply and maintain a pressure on the lubricant 40a equal to the external pressure, the wiping contact of the internal annular marginal edge 51 of the diaphragm 50 tending to prevent the ingress of water into the shell. When the swivel is inserted in a mine sweep wire or is used to connect a tow cable to an object, such as a paravane, water kite, or float, the direction of travel of the swivel may be either parallel or at an angle to the longitudinal axis of the swivel and hydrodynamic pressures will exist exteriorly of the shell 28. The longitudinal and radial ducts 46, 47, and 52 tend to equalize these hydrodynamic pressures by establishing communication between zones of unequal pressure at the sides and ends of the shell. When the swivel 15 is removed from the water and subjected to high temperatures, as by exposing to the rays of the sun on the deck of a ship, expansion of the lubricant in the shell may occur, but the diaphragms 44, 50 will flex outwardly so as to prevent the escape of the lubricant.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

We claim:

1. In a swivel, a shell constituting a housing, said shell being filled with lubricant and provided with a flexible wall exposed to the pressure of the medium surrounding the shell for applying and maintaining pressure in the shell substantially equal to the pressure externally of the shell.

2. In a swivel having an axle and a shell rotatable on the axle, sealing means for the shell comprising an annular flexible diaphragm having its outer marginal edge portion secured to the shell, said diaphragm encircling the axle, the inner diameter of the diaphragm being slightly less than the diameter of the axle.

3. An underwater swivel comprising a cylindrical axle having attachment means at one end portion and an enlarged opposite end portion providing an annular shoulder, an annular axial thrust bearing on the cylindrical axle and having one end face abutting said shoulder, a cylindrical shell surrounding said bearing and having a wall at one end spaced from the enlarged end of said cylindrical axle, said shell at its opposite end including an inwardly extending annular closure encircling said cylindrical axle and engaging said bearing at its opposite end face, said shell being filled with lubricant for said bearing, and means applying and maintaining a pressure on said lubricant substantially equal to the pressure of the medium surrounding said shell.

4. An underwater swivel as defined in claim 3, wherein said pressure applying and maintaining means includes a flexible diaphragm having its peripheral margin secured to said shell wall at its inner face, said shell wall having at least one through passageway for transmitting external pressure to the diaphragm.

5. An underwater swivel as defined in claim 3, including a flexible annular diaphragm having its outer margin secured to said annular closure, the internal diameter of said annular diaphragm being slightly less than the diameter of said cylindrical axle so that the inner marginal edge of said annular diaphragm snugly encircles the cylindrical axle.

6. An underwater swivel as defined in claim 3, wherein said pressure applying and maintaining means includes a flexible diaphragm having its peripheral margin secured to said shell wall at its inner face, said shell wall having at least one through passageway for transmitting external pressure to the diaphragm, and a flexible annular diaphragm having its outer margin secured to said annular closure, the internal diameter of said annular diaphragm being slightly less than the diameter of said cylindrical axle so that the inner marginal edge of said annular diaphragm snugly encircles the cylindrical axle.

7. An underwater swivel as defined in claim 3, wherein said cylindrical axle comprises a cap screw having a shank and a spacer sleeve on the shank extending from said annular shoulder to a section of the shank inwardly of its end, and said attachment means is in external screw threaded engagement with said shank and abuts said spacer sleeve.

8. An underwater swivel as defined in claim 3, wherein said pressure applying and maintaining means includes a flexible diaphragm having its peripheral margin secured to said shell wall at its inner face, said shell being provided with at least one passageway extending between the inner and outer faces of said shell wall and other passageways extending between said inner face and spaced zones on the circumferential surface of said shell for equalizing dynamic pressure on the diaphragm produced by motion of the swivel in the surrounding medium, a flexible annular diaphragm having its outer margin secured to said annular closure, the internal diameter of said annular diaphragm being slightly less than the diameter of said cylindrical axle so that the inner marginal edge of said annular diaphragm snugly encircles the cylindrical axle, and said attachment means including a circular wall disposed in outwardly spaced shielded relation to said annular flexible diaphragm, said circular wall being provided with at least one through passageway for transmitting pressure between the outer and inner faces thereof.

JOHN PLUM.
HARRY B. MARIS.